Aug. 11, 1942.  J. J. McCABE ET AL  2,292,536
MOTOR MOUNTING
Original Filed May 1, 1934
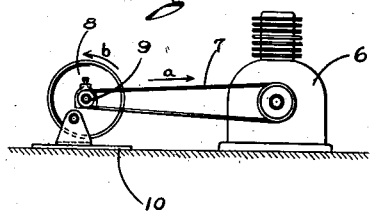
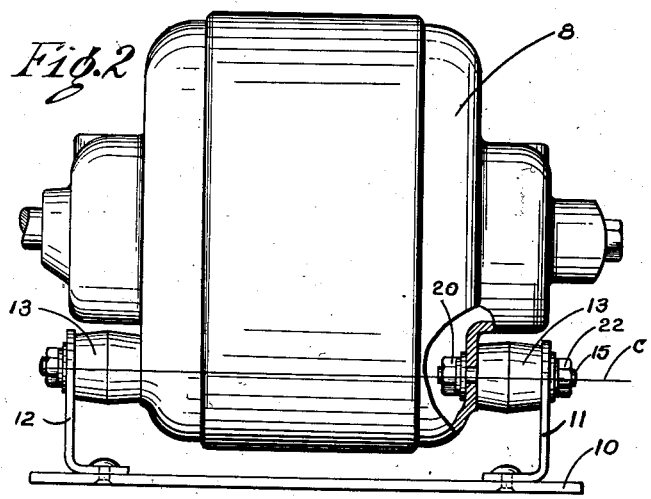
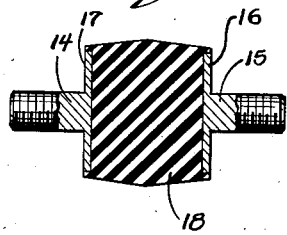
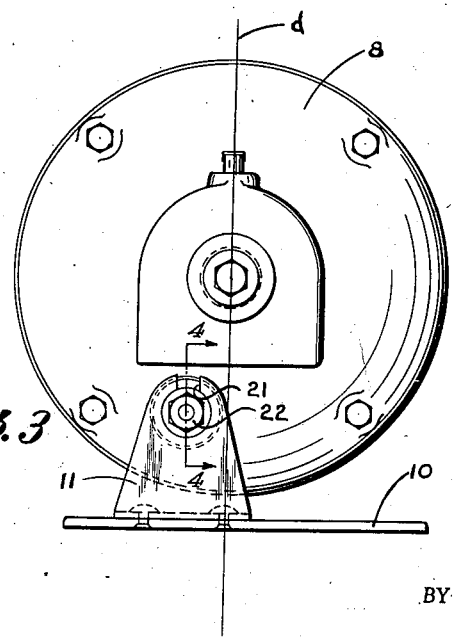
INVENTORS
JOHN J. McCABE
& PAUL E. FRANTZ
BY Donald W. Farrington
ATTORNEY.

Patented Aug. 11, 1942

2,292,536

UNITED STATES PATENT OFFICE 2,292,536

MOTOR MOUNTING

John J. McCabe, Worcester, Mass., and Paul E. Frantz, Euclid, Ohio, assignors to The Apex Electrical Manufacturing Company, Cleveland, Ohio, a corporation of Ohio Original application May 1, 1934, Serial No. 723,422. Divided and this application November 6, 1939, Serial No. 303,102

3 Claims. (Cl. 74—242.9)

Our invention relates to a motor mounting, and more particularly to a resilient type of motor mounting such as for instance the type disclosed in our copending application Serial No. 723,422, filed May 1, 1934, now Patent No. 2,185,- 215, of which the instant application is a division.

It is among the objects of our invention to provide a flexible mounting for the motor or power unit in a belt-driven assembly wherein the power unit is subjected to periodically varying forces and wherein the mounting is adapted to absorb the vibration of such forces and automatically maintain a proper tension on the belt in such assembly.

It is a further object of our invention to provide a flexible mounting according to the preceding object wherein the mounting utilizes the torque reactions attendant upon the power unit drive to automatically control the tension of the belt so as to maintain the most efficient driving relation between the power unit and the driven mechanism.

It is a further object of our invention to provide a motor mounting in accordance with the preceding objects wherein the motor is supported for movement about an axis parallel to the rotor axis and at one side of a vertical plane through the rotor axis whereby the weight of the motor tends to turn the motor in one direction about its mounting axis and the torque reactions incident to drive tend to turn the motor in an opposite direction with respect to said same axis.

Further objects relating to simplicity, sturdiness in construction and economies in manufacture, will appear from the following description and the appended drawing, wherein:

Figure 1 is an elevation showing a belt-driven assembly provided with a motor mounting made according to our invention;

Figure 2 is an elevation taken at right angles to the view of Figure 1 showing the motor mounting made according to our invention;

Figure 3 is an end view of the motor mounting shown in Figure 2; and

Figure 4 is a sectional view, taken through the resilient mounting unit as indicated in lines 4—4 of Figure 3.

We have illustrated our invention in this application as the invention may be utilized in a belt-driven assembly such as is conventional in refrigeration systems wherein a refrigerant compressor 6 is driven by a motor 8 through a belt 7. It will be appreciated as the description proceeds that a motor mounting made according to our invention may be advantageously employed in other driving and driven assemblies.

It will be understood by those skilled in the art that in a belt-driven assembly such as illustrated in Figure 1, wherein the motor pulley 9 is turning clockwise to drive the belt 7 in the direction indicated by arrow A, a counter-clockwise reaction as indicated at B is produced in the stator of the motor.

It will also be understood that because of the high starting load, such as found in refrigerant compressors, it is desirable to permit the motor pulley to slip slightly with respect to the belt so that the motor may acquire a speed at which it is efficiently capable of driving the compressor.

It is also desirable that as soon as the motor has acquired an efficient speed with respect to the load, it will effect a non-slip drive to the belt.

We have obtained the above-mentioned desirable results and the objects heretofore outlined in this application by mounting the motor 8 in its entirety so that it may move within certain limits and as permitted by certain restraining forces about the axis indicated at C in Figure 2.

The motor base preferably comprises a flat metal portion 10 provided with a pair of spaced, upstanding ears 11 and 12. The ears are spaced with respect to each other and with respect to the dimensions of the motor so as to permit the insertion between each ear and the motor of a resilient connection indicated in its entirety as at 13. The connection 13 comprises a pair of oppositely-extending bolts or studs 14 and 15 having threaded shanks and enlarged flat head portions 17 and 16, respectively. The studs 14 and 15 are securely bonded to each other by a resilient block or rubber 18 or the like which may be vulcanized or otherwise secured to the enlarged head portions 17 and 16, respectively.

The mounting units 13 may be secured to the motor as indicated in Figure 2 by the nut and washer fastening 20 within the motor end caps. The supporting ears 11 and 12 are slotted as indicated at 21 in Figure 5 and a second nut and washer assembly 22 may be tightened on the shank 15 so as to clamp the resilient mounting 13 to its supporting ear.

From the foregoing description of the structural elements entering into a motor support made according to our invention, it will be observed that the motor may rock about the axis indicated at C in response to torque reactions caused by variations in load. Such movements about the axis C are cushioned and dampened by the resilient rubber block 18. Since the axis C is disposed at one side of the vertical plane through the motor axis, the weight of the motor tends to turn the motor in its entirety in a clockwise direction with respect to the axis C.

Referring again to Figure 1, it will be observed that the clockwise tendency of the motor to turn about axis C, due to the weight of the motor is opposed and counteracted by the counter-clockwise tendency of the motor to turn in the direction of arrow B in response to torque reaction in the stator. Since the shank or threaded portions 14 and 15 of the connector element are intended to be securely clamped to the motor and supporting ear, respectively, both the clockwise and counterclockwise tendency of the motor to turn about axis C produces a torsional and sheering strain in the rubber block element 18.

Upon starting the motor and compressor assembly such as shown in Figure 1, it will be observed the first increment of motor reaction in direction of arrow B is utilized to overcome clockwise turning effect about axis C caused by the weight of the motor. In other words, the torsional strain in the rubber block 18, present in the motor in its static condition, aids the torque reaction in the stator in moving the entire motor about its axis in the direction of the arrow B.

The eccentricity of the axis C with respect to the rotor axis of the motor and the size and character of the rubber mounting 13, are preferably selected with respect to the torque and load characteristics of the assembly so that the motor will move about the axis C in response to torque load variations to maintain the most efficient slipping and driving relationship with the belt 7.

Although we have shown and described one form of our invention in this application in considerable detail, it will be appreciated by those skilled in the art that numerous modifications may be made therein and that the invention itself may be embodied in other assemblies than as shown, without departing from the scope of the invention as defined in the following claims.

Having thus described our invention, what we claim is:

1. In combination, driving and driven machines connected by a belt, said driving machine comprising a motor having a stator and a rotor provided with a pulley, said motor being designed for pulley rotation to effect tension in the lower reach of the belt, means to yieldingly mount said motor for movement about an axis parallel to the motor shaft, including a base, brackets on said base having resilient connections with said stator at one side of a plane through the rotor axis normal to the base, said resilient connections positioned on that side of said plane which is remote from the driven machine, to effect a bias of the driving machine towards the driven machine by the weight of the motor.

2. In combination, driving and driven machines having pulleys connected by a belt, a base for said driving machine, said driving machine comprising a motor having a stator and a rotor, said motor having a directional rotation to effect tension in that reach of the belt adjacent to the base, means to yieldingly mount said motor for movement about an axis parallel to the axis of the rotor including brackets on said base having resilient connections with said stator on one side of the plane through the rotor axis normal to the base, said resilient connections positioned on that side of said plane which is remote from the driven machine to effect a bias of the driving machine toward the driven machine by the weight of the motor.

3. In a motor mounting, a motor base having laterally extending ears, a motor comprising a stator and a rotor, means resiliently connecting the stator to said ears at one side of a plane through the axis of the rotor normal to the base to provide for limited movement of the motor about an axis parallel to the rotor axis, said motor having a rotor rotation in a direction away from the base on the same side of said plane as said means connecting the stator to the base to effect bodily movement of the motor away from the base in response to the torque reaction in the stator.

PAUL E. FRANTZ.
JOHN J. McCABE.